United States Patent Office 3,281,466
Patented Oct. 25, 1966

3,281,466
ANILIDE-CONNECTED SALICYLANILIDE CONDENSATION PRODUCTS OF FLUOROACETONE
Herbert C. Stecker, 1 Bridle Way, Ho-Ho-Kus, N.J.
No Drawing. Filed Dec. 4, 1963, Ser. No. 328,106
6 Claims. (Cl. 260—559)

This invention relates to anilide-connected salicylanilide condensation products of fluoroacetone. More specifically, it deals with a reaction product of a salicylanilide with a fluoroacetone, the condensation taking place at the anilide portion of the salicylanilide.

The reaction involved herein may be outlined generally as follows:

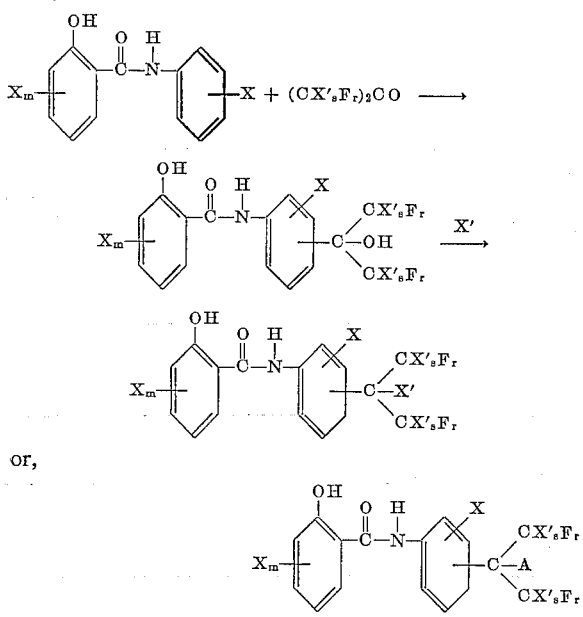

wherein:

X represents a member of the class consisting of hydrogen, chlorine, bromine and iodine,
X' represents a halogen of the class consisting of chlorine, bromine, and iodine,
A represents a member of the class consisting of OH, chlorine, bromine and iodine,
m represents one of the numerals 1 and 2,
r represents one of the numerals 1, 2, and 3, and
s represents one of the numerals 1 and 2, the sum of r and s always being 3.

From the foregoing, it will be noted that the fluoracetone reacting must contain at least two fluorine atoms, which means that the substituted acetone reacting must contain two, four or six fluorine atoms, the other substituents thereon being bromine, chlorine and/or iodine. The other reactant must be a salicylanilide which may contain one or two halogen atoms on the salicyl group, and may contain a directly-substituted halogen on the anilide group. The reaction first produces a hydroxyl radical attached to the methylene atom, which radical may be readily replaced with a halogen atom, such as chlorine, bromine or iodine.

A typical reaction, according to this invention, is as follows:

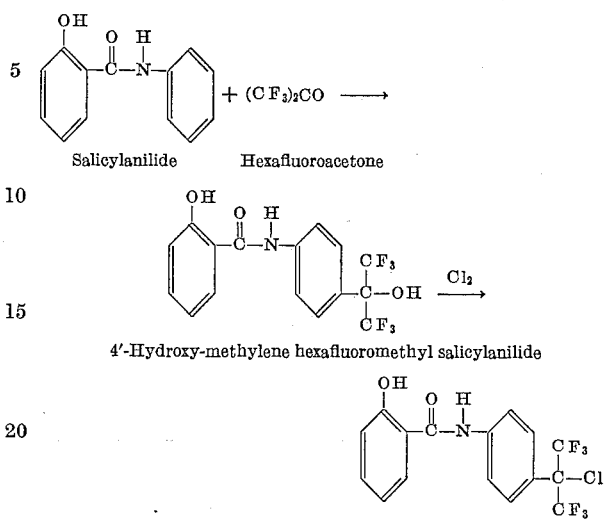

These compounds may be made according to the following procedure:

*4'-hydroxy-methylene hexafluoromethyl salicylanilide and corresponding chloroderivative*

One mole of salicylanilide is placed in a reaction flask with sufficient naphthalene to produce a thin slurry, and the mixture is heated to 170° C. with stirring. While holding this temperature, 1.1 moles of hexafluoroacetone hydrate are added over a 2 hour period, after which additional heating at 170° C. is continued for one-half hour. The hydroxy product then is allowed to cool and is separated out as a crude mixture which is recrystallized from a petroleum ether-naphthalene mixture.

The tertiary hydroxy group on the methylene substituent is easily replaced by chlorine by refluxing for a short time with thionyl chloride.

Table I lists examples of compounds prepared in accordance with the present invention.

These compounds have been found to have excellent activity against bacteria, such as *S. aureus*, and against fungi. Typical germicidal data are given in Table II. The germicidal activities in this table are given in the same order and for the compounds, as numbered in Table I. The germicidal activity of the compounds was tested as follows:

Ten milligrams of each compound were dissolved in 1000 ml. of nutrient broth adjusted to pH 6.8. From each such dilution, 10 ml. dilutions were prepared in sterile broth varying in strength between 10 p.p.m. and 0.2 p.p.m., utilizing 20 tubes for each compound. Each dilution was inoculated with 0.1 ml. of a 24-hour old broth culture of *S. aureus*, and all tubes were read for density on a densitometer, and the values recorded. A control broth was inoculated. All tubes were inoculated at 37° C. for exactly 24 hours. Following inoculation, all tubes were re-read in the densitometer and, since growth of the organism creates turbidity, the higher the densitometer reading, the greater the growth. A turbidometric reading equal to that of the control would indicate no activity of the compound. A reading equal to that prior to incubation indicates 100% activity of the compound. The results given in Table II show the concentration at which increase in densitometer reading was observed.

These compounds also are active against animal parasites, such as liver fluke, and the like, in dosages of about 20–30 mg. per kg. of body weight.

These compounds have been found to be excellent mildew-proofing and germicidal agents for fibrous materials such as cloth, leather, paper, wood, and the like. Treatment of fibrous material may be made with a solution or dispersion of the germicide in a liquid medium, leaving about 0.001% to 0.05%, or even 0.5% or as much as 5.0% by weight of the germicide in the fibrous material.

The germicides of the present invention also may be incorporated in plastics, such as rubber, polyethylene, polystyrene, polyurethane, nylon, and similar plastoform and elastoform compositions by incorporating the germicide in an amount of 0.001% to 0.05% or even 0.1% or as much as 0.5% and 5.0% in the batch which is mixed or kneaded prior to vulcanization, extrusion or other forming operation.

The compounds of the present invention are particularly valuable in detergent and toilet detergent compositions, in the amount of 0.001% to 0.01% by weight, and to about 0.5% or even 1.0%, 2%, 5% even 10%. They may be admixed in commercial toilet soaps, such as neutral high grade sodium and potassium salts of fatty acids from tallow, olive oil, palm oil, and the like, above or with non-soap synthetic detergents, e.g., non-ionic, anionic, or cationic.

The term "detergent" employed herein includes fatty acid soaps, as well as synthetic detergents, and other detergents, such as fatty alcohol sulfates, fatty acid amides, sodium tripolyphosphates, and combinations thereof. The term "toilet soap" used herein also is employed in its popular meaning, that is, those compositions employed for cleansing the skin and prepared from an alkali metal compound, such as potassium or sodium hydroxide and a fat or fatty acid, both saturated and unsaturated. The compositions described herein also include other antiseptic agents, emollients, water softeners, antioxidants, dyes, perfume, "cold cream" additives, and the like.

The germicidal compounds of the present invention may be used with anionic detergents, such as sodium hexadecyl sulfate, or with cationic detergents, as exemplified by dimethyl-stearamidopropyl-2-hydroxyethyl ammonium dihydrogen phosphate, or with non-ionic detergents, such as polyoxypropylene, polyoxyethelene condensates, alone or in admixture with other detergents heretofore enumerated. They are also effective in scouring powders, detergent cleaners, and the like.

TABLE I

| No. | Compound | Formula | Analysis for Halogen (%) | | | Percent Calculated | | |
|---|---|---|---|---|---|---|---|---|
| | | | F | Cl | Br | F | Cl | Br |
| 1 | [structure: phenol-C(=O)-NH-phenyl-C(CF$_3$)$_2$OH] | $C_{16}H_{11}O_3NF_6$ (M.W. 379) | 30.0 | | | 30.1 | | |
| 2 | [structure: phenol-C(=O)-NH-phenyl-C(CF$_2$Cl)$_2$OH] | $C_{16}H_{11}O_3NF_4Cl_2$ (M.W. 412) | 18.5 | 17.1 | | 18.4 | 17.2 | |
| 3 | [structure: phenol-C(=O)-NH-phenyl-C(CFCl$_2$)$_2$OH] | $C_{16}H_{11}O_3NF_2Cl_4$ (M.W. 445) | 8.5 | 32.0 | | 8.5 | 31.9 | |
| 4 | [structure: phenol-C(=O)-NH-phenyl-C(CF$_3$)$_2$Cl] | $C_{16}H_{10}O_2NF_6Cl$ (M.W. 397.5) | 28.8 | 8.9 | | 28.7 | 8.9 | |
| 5 | [structure: phenol-C(=O)-NH-phenyl-C(CF$_2$Cl)$_2$Cl] | $C_{16}H_{10}O_2NF_4Cl_3$ (M.W. 430.5) | 17.6 | 24.8 | | 17.7 | 24.7 | |
| 6 | [structure: phenol-C(=O)-NH-phenyl-C(CFCl$_2$)$_2$Cl] | $C_{16}H_{10}O_2NF_2Cl_5$ (M.W. 463.5) | 8.2 | 38.4 | | 8.2 | 38.3 | |

TABLE 1—Continued

| No. | Compound | Formula | Analysis for Halogen (%) | | | Percent Calculated | | |
|---|---|---|---|---|---|---|---|---|
| | | | F | Cl | Br | F | Cl | Br |
| 7 | (structure) | $C_{16}H_{11}O_3NF_6$ (M.W. 379) | 30.1 | | | 30.1 | | |
| 8 | (structure) | $C_{16}H_{11}O_3NF_4Cl_2$ (M.W. 412) | 18.3 | 17.3 | | 18.4 | 17.2 | |
| 9 | (structure) | $C_{16}H_{11}O_3NF_2Cl_4$ (M.W. 445) | 8.5 | 31.8 | | 8.5 | 31.9 | |
| 10 | (structure) | $C_{16}H_9O_3NF_6Br_2$ (M.W. 537) | 21.0 | | 29.6 | 21.2 | | 29.8 |
| 11 | (structure) | $C_{16}H_9O_2NF_6ClBr$ (M.W. 476.5) | 23.5 | 7.5 | 16.5 | 23.9 | 7.4 | 16.8 |
| 12 | (structure) | $C_{16}H_7O_2NF_4Br_6$ (M.W. 801) | 9.6 | | 60.0 | 9.5 | | 59.9 |
| 13 | (structure) | $C_{16}H_9O_3NF_6I_2$ (M.W. 631) | 18.0 | | 40.1 | 18.1 | | 40.3 |

TABLE II.—GERMICIDAL ACTIVITY

| Compound No. | Minimum Inhibitory Concentration (p.p.m.) | |
|---|---|---|
| | S. aureus | S. choleraesuis |
| 1 | 1.0 | 1.0 |
| 2 | 0.7 | 0.6 |
| 3 | 0.6 | 0.5 |
| 4 | 0.7 | 0.6 |
| 5 | 0.5 | 0.4 |
| 6 | 0.5 | 0.4 |
| 7 | 0.8 | 0.8 |
| 8 | 0.8 | 0.8 |
| 9 | 0.8 | 0.7 |
| 10 | 0.6 | 0.5 |
| 11 | 0.7 | 0.7 |
| 12 | 0.5 | 0.4 |
| 13 | 0.6 | 0.6 |

I claim:
1. A compound having the formula:

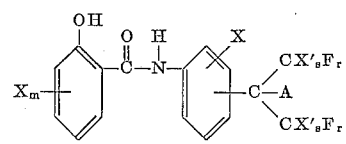

wherein:
X represents a member of the class consisting of hydrogen, chlorine, bromine and iodine,
X' represents a halogen of the class consisting of chlorine, bromine, and iodine,
A represents a member of the class consisting of OH, chlorine, bromine and iodine,
m represents one of the numerals 1 and 2,
r represents one of the numerals 1, 2, and 3, and $s$ represents one of the numerals 1 and 2, the sum of $r$ and $s$ always being 3.
2.
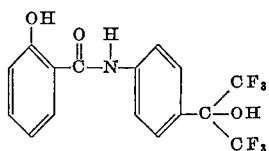
3.
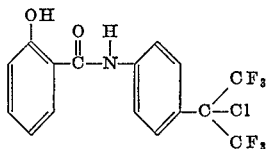
4.
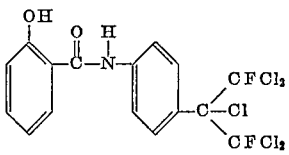
5.
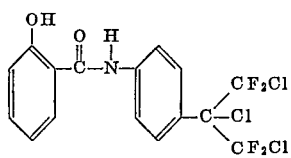
6.
No references cited.
WALTER A. MODANCE, *Primary Examiner.*
NATALIE TROUSOF, *Assistant Examiner.*